United States Patent
Kawakami

(10) Patent No.: US 11,332,157 B2
(45) Date of Patent: May 17, 2022

(54) VEHICLE CONTROL APPARATUS

(71) Applicant: Mitsubishi Electric Corporation, Tokyo (JP)

(72) Inventor: Daisuke Kawakami, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/049,967

(22) PCT Filed: Jul. 3, 2018

(86) PCT No.: PCT/JP2018/025151
§ 371 (c)(1),
(2) Date: Oct. 23, 2020

(87) PCT Pub. No.: WO2020/008515
PCT Pub. Date: Jan. 9, 2020

(65) Prior Publication Data
US 2021/0237770 A1 Aug. 5, 2021

(51) Int. Cl.
*B60W 60/00* (2020.01)
*B60W 50/00* (2006.01)
(Continued)

(52) U.S. Cl.
CPC ........ *B60W 60/0011* (2020.02); *B60W 10/20* (2013.01); *B60W 40/068* (2013.01);
(Continued)

(58) Field of Classification Search
CPC ............ B60W 60/0011; B60W 10/20; B60W 40/068; B60W 40/105; B60W 50/00;
(Continued)

(56) References Cited

U.S. PATENT DOCUMENTS 5,742,919 A * 4/1998 Ashrafi ............... B60G 17/018
701/72
5,919,238 A * 7/1999 Lavey .................... G01B 7/315
701/41

(Continued)

FOREIGN PATENT DOCUMENTS

CN 108928351 B * 8/2021 ............. B60K 35/00
JP 2002367099 A * 12/2002
(Continued)

OTHER PUBLICATIONS

JP2018058418.translate (Emergency Steering Assist System) (Year: 2018).*
(Continued)

*Primary Examiner* — B M M Hannan
(74) *Attorney, Agent, or Firm* — Xsensus LLP

(57) ABSTRACT

A vehicle control apparatus includes an automatic driving control device determining a travel route at a time of executing an automatic driving based on surrounding environment information and position information of a vehicle, and outputting a control amount corresponding to the travel route, and a steering control device calculating a steering control amount based on the control target value. There is a performing of steering control of the vehicle based on the steering control amount, wherein the automatic driving control device dynamically determines a control amount threshold value for regulating a limit of the steering control amount based on automatic driving control information indicating a control state in an automatic driving of the vehicle, and provides the steering control device with the control amount threshold value, and the steering control device changes the steering control amount not to exceed the control amount threshold value.

10 Claims, 11 Drawing Sheets

(51) Int. Cl.
*B60W 10/20* (2006.01)
*B60W 40/068* (2012.01)
*B60W 40/105* (2012.01)

(52) U.S. Cl.
CPC .......... *B60W 40/105* (2013.01); *B60W 50/00* (2013.01); *B60W 2050/0054* (2013.01); *B60W 2552/40* (2020.02)

(58) Field of Classification Search
CPC ...... B60W 2050/0054; B60W 2552/40; B62D 6/006; B62D 6/002; B62D 15/025
USPC .......................................................... 701/41
See application file for complete search history.

(56) References Cited

U.S. PATENT DOCUMENTS

| | | | | |
|---|---|---|---|---|
| 6,502,025 | B1* | 12/2002 | Kempen | B62D 15/0215 701/41 |
| 10,486,692 | B2* | 11/2019 | Nishimura | B60W 10/18 |
| 11,152,782 | B2* | 10/2021 | Yamashita | H02H 7/20 |
| 2003/0100981 | A1* | 5/2003 | Suzuki | B62D 6/10 180/443 |
| 2006/0080015 | A1* | 4/2006 | Voeller | G01B 21/26 701/41 |
| 2006/0293818 | A1* | 12/2006 | Lu | B62D 15/0235 701/41 |
| 2011/0257844 | A1* | 10/2011 | Cassar | B62D 15/021 701/41 |
| 2012/0078471 | A1* | 3/2012 | Siefring | B62D 15/0265 701/41 |
| 2015/0120139 | A1* | 4/2015 | Yamada | B62D 6/005 701/41 |
| 2015/0266510 | A1* | 9/2015 | Bang | G08G 1/167 701/41 |
| 2016/0046321 | A1* | 2/2016 | Takashima | B62D 6/002 701/41 |
| 2017/0120908 | A1* | 5/2017 | Oniwa | B60W 30/10 |
| 2017/0122754 | A1* | 5/2017 | Konishi | B60W 30/18154 |
| 2017/0203788 | A1* | 7/2017 | Heo | B62D 15/021 |
| 2017/0259817 | A1* | 9/2017 | Horiguchi | B60W 30/18145 |
| 2018/0037235 | A1* | 2/2018 | Otake | B60K 28/06 |
| 2018/0113455 | A1* | 4/2018 | Iagnemma | B60W 30/00 |
| 2018/0154824 | A1* | 6/2018 | Urano | G01C 21/3415 |
| 2018/0170377 | A1* | 6/2018 | Tatsukawa | B62D 15/025 |
| 2018/0237031 | A1* | 8/2018 | Imai | B60W 10/18 |
| 2018/0281844 | A1* | 10/2018 | Wijffels | B62D 6/002 |
| 2018/0284775 | A1* | 10/2018 | Brettschneider | B60W 30/18145 |
| 2018/0284791 | A1* | 10/2018 | Furukawa | G05D 1/0214 |
| 2018/0292822 | A1* | 10/2018 | Ichikawa | G05D 1/0257 |
| 2018/0312161 | A1 | 11/2018 | Asakura et al. | |
| 2018/0339725 | A1* | 11/2018 | Kodera | B62D 6/002 |
| 2018/0348779 | A1* | 12/2018 | Oniwa | G06K 9/00798 |
| 2019/0094855 | A1* | 3/2019 | Choi | G01C 21/32 |
| 2019/0337507 | A1* | 11/2019 | Stein | G05D 1/0212 |
| 2020/0057447 | A1* | 2/2020 | Kato | B60W 40/02 |
| 2021/0300348 | A1* | 9/2021 | Yasui | B60W 30/0956 |

FOREIGN PATENT DOCUMENTS

| | | | | |
|---|---|---|---|---|
| JP | 2004142510 A | * | 5/2004 | .......... B62D 15/027 |
| JP | 2007-322255 A | | 12/2007 | |
| JP | 2015-209140 A | | 11/2015 | |
| JP | 2016-124337 A | | 7/2016 | |
| JP | 2018-12390 A | | 1/2018 | |
| JP | 2018058418 A | * | 4/2018 | |
| JP | 6463571 B1 | * | 2/2019 | .......... B60W 40/068 |
| JP | 2019055673 A | * | 4/2019 | .......... B60W 30/182 |
| WO | 2017/077807 A1 | | 5/2017 | |

OTHER PUBLICATIONS

Office Action dated Jan. 28, 2021 in Indian Patent Application No. 202027047083, 6 pages.
International Search Report and Written Opinion dated Aug. 21, 2018 for PCT/JP2018/025151 filed on Jul. 3, 2018, 11 pages including English Translation of the International Search Report.

* cited by examiner

FIG. 4

| SUBJECT VEHICLE CONTROL STATE | CONTROL AMOUNT THRESHOLD VALUE (MOTOR CURRENT VALUE IN ACCORDANCE WITH TORQUE) | |
|---|---|---|
| | UPPER LIMIT | LOWER LIMIT |
| PARKING STATE | THRESHOLD VALUE IS NOT SET | THRESHOLD VALUE IS NOT SET |
| MANUAL TRAVEL STATE | THRESHOLD VALUE IS NOT SET | THRESHOLD VALUE IS NOT SET |
| STATE OF TRAVELING ALONG STRAIGHT ROAD (CURVATURE <r1) (NORMAL TRAVELING) | $L1_{High}$ | THRESHOLD VALUE IS NOT SET |
| STATE OF TRAVELING ALONG CURVED ROAD (r1≤ CURVATURE <r2) (NORMAL TRAVELING) | $L1_{High}+L2_{High}$ | $L2_{Low}$ |
| STATE OF TRAVELING ALONG CURVED ROAD (r2≤ CURVATURE) (NORMAL TRAVELING) | $L1_{High}+L3_{High}$ | $L3_{Low}$ |
| STATE OF TRAVELING ALONG STRAIGHT ROAD (CURVATURE <r1) (LANE CHANGE) | $L1_{High}+L4_{High}$ | THRESHOLD VALUE IS NOT SET |
| STATE OF TRAVELING ALONG CURVED ROAD (r1≤ CURVATURE <r2) (LANE CHANGE) (IN CASE OF LANE CHANGE IN SAME DIRECTION AS CURVE) | $L1_{High}+L2_{High}+L4_{High}$ | $L2_{Low}$ |
| STATE OF TRAVELING ALONG CURVED ROAD (r1≤ CURVATURE <r2) (LANE CHANGE) (IN CASE OF LANE CHANGE IN DIRECTION OPPOSITE TO CURVE) | $L1_{High}+L2_{High}$ | $L2_{Low}$ |
| STATE OF TRAVELING ALONG CURVED ROAD (r2≤ CURVATURE) (LANE CHANGE) (IN CASE OF LANE CHANGE IN SAME DIRECTION AS CURVE) | $L1_{High}+L3_{High}+L4_{High}$ | $L3_{Low}$ |
| STATE OF TRAVELING ALONG CURVED ROAD (r2≤ CURVATURE) (LANE CHANGE) (IN CASE OF LANE CHANGE IN DIRECTION OPPOSITE TO CURVE) | $L1_{High}+L3_{High}$ | $L3_{Low}$ |
| STATE OF TURNING RIGHT AND LEFT | $L5_{High}$ | THRESHOLD VALUE IS NOT SET |
| PARKING STATE (NORMAL MOVEMENT) | $L6_{High}$ | THRESHOLD VALUE IS NOT SET |
| PARKING STATE (TURN-BACK) | $L7_{High}$ | THRESHOLD VALUE IS NOT SET |

F I G. 7
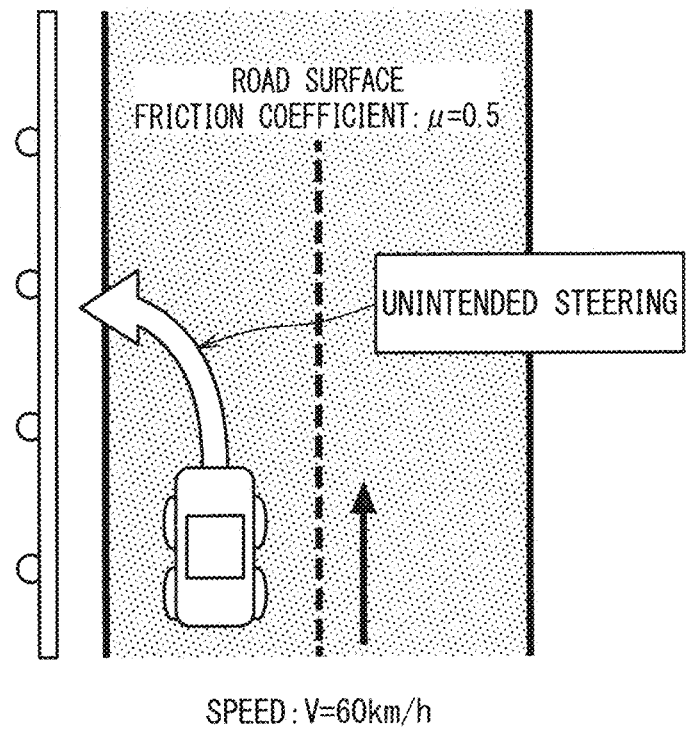
F I G. 8
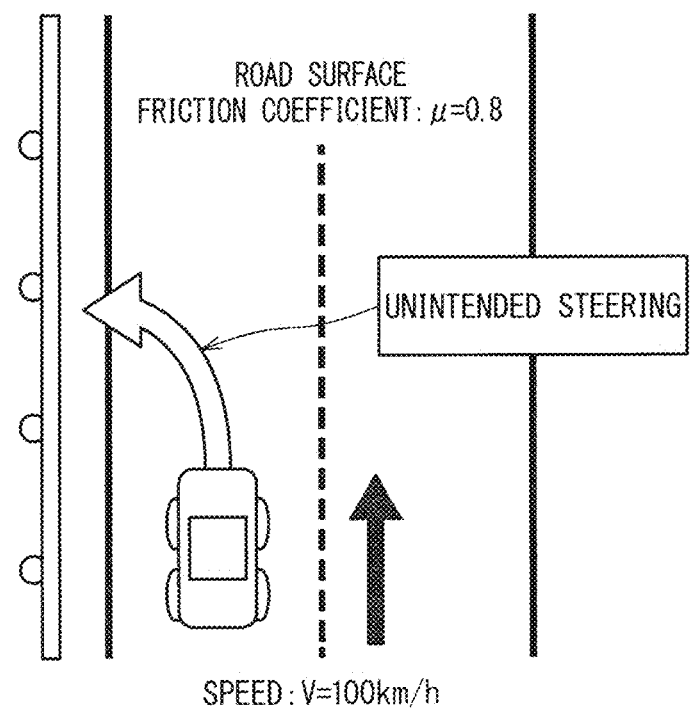

VEHICLE CONTROL APPARATUS

CROSS-REFERENCE TO RELATED APPLICATION

The present application is based on PCT filing PCT/JP2018/025151, filed Jul. 3, 2018, the entire contents of which are incorporated herein by reference.

TECHNICAL FIELD

The present invention relates to a vehicle control apparatus automatically controlling driving of a vehicle.

BACKGROUND ART

Various types of electronic apparatuses are mounted on an in-vehicle system. An in-vehicle control apparatus, which is referred to as an electronic control unit (ECU) for controlling these electronic apparatuses, mounted on a vehicle increases in number in accordance with multifunctionality and diversification of electronic apparatus in recent years. Particularly, in an automatic drive system in which a research development is accelerated recently, designed is a system of achieving an advanced automatic driving by coordinating engine control, brake control, and steering control of a vehicle.

In an electronic power steering control device (steering control device) used for the automatic driving, when a failure occurs in a part of a system, an fail operation needs to be achieved. When the fail operation is also hardly performed, fail-safe needs to be achieved by a minimum function other than a function in which the failure occurs.

A function of limiting control of a steering control device is mounted in some cases to prevent an unintended steering operation in a case where an abnormality occurs in a steering control device. For example, Patent Document 1 obtains road information of a travel route of a subject vehicle obtained from a navigation device, thereby providing a limitation on a targeted steering angle in accordance with the road information. Patent Document 2 discloses a method of detecting output current of an actuator calculated in a steering control device to detect an abnormal output.

PRIOR ART DOCUMENTS

Patent Documents

Patent Document 1: International Publication No. 2017/077807
Patent Document 2: Japanese Patent Application Laid-Open No. 2015-209140

SUMMARY

Problem to be Solved by the Invention

Patent Document 1 provides the limitation on the targeted steering angle to prevent the unintended steering operation, however, considered is a possibility that an unintended output is performed regardless of the targeted steering angle if a calculation part itself calculating an operation amount of the actuator of the steering control device breaks down. In Patent Document 2, the output current of the actuator calculated in the steering control device is compared with a threshold value, thus a state where the output current is too large can be detected as an abnormal state. However, when the automatic driving is highly developed, use cases requiring various sizes of steering operations, such as a case of turning right and left in a general road and parking in addition to a traveling of a straight road such as an express way, are needed occur, thus there is a problem that appropriate control cannot be performed if a fixed threshold value is used. Furthermore, in Patent Document 2, an upper limit of the output current is monitored, however, there is no description of a monitoring of a lower limit, thus there is also a problem that such a configuration cannot cope with a state where a steering is suspended during traveling along a curved road, for example.

The present invention therefore has been made to solve problems as described above, and it is an object of the present invention to provide a vehicle control apparatus capable of appropriately setting a threshold value of a steering control amount.

MEANS TO SOLVE THE PROBLEM

A vehicle control apparatus according to the present invention includes: an automatic driving control device determining a travel route at a time of executing an automatic driving based on surrounding environment information and position information of a vehicle, and outputting a control target value corresponding to the travel route; and a steering control device calculating a steering control amount based on the control target value, and performing steering control of the vehicle based on the steering control amount, wherein the automatic driving control device generates automatic driving control information indicating a control state in an automatic driving of the vehicle and including the control target value, dynamically determines a control amount threshold value for regulating a limit of the steering control amount based on the automatic driving control information which has been generated, and provides the steering control device with the control amount threshold value, and the steering control device changes the control amount not to exceed the control amount threshold value when the steering control amount exceeds the control amount threshold value.

Effects of the Invention

According to the vehicle control device of the present invention, the control amount threshold value of the steering control can be appropriately set, and both an expansion of functionality and safety in the automatic driving can be achieved.

BRIEF DESCRIPTION OF DRAWINGS

FIG. 4 is a drawing illustrating an example of a table for determining the control amount threshold value of the vehicle control apparatus of the embodiment 1 according to the present invention.

FIG. 7 is a drawing for describing a condition of correcting the control amount threshold value in the vehicle control apparatus of the embodiment 1 according to the present invention.

FIG. 8 is a drawing for describing a condition of correcting the control amount threshold value in the vehicle control apparatus of the embodiment 1 according to the present invention.

DESCRIPTION OF EMBODIMENT(S)

Embodiment 1

Figure 1:
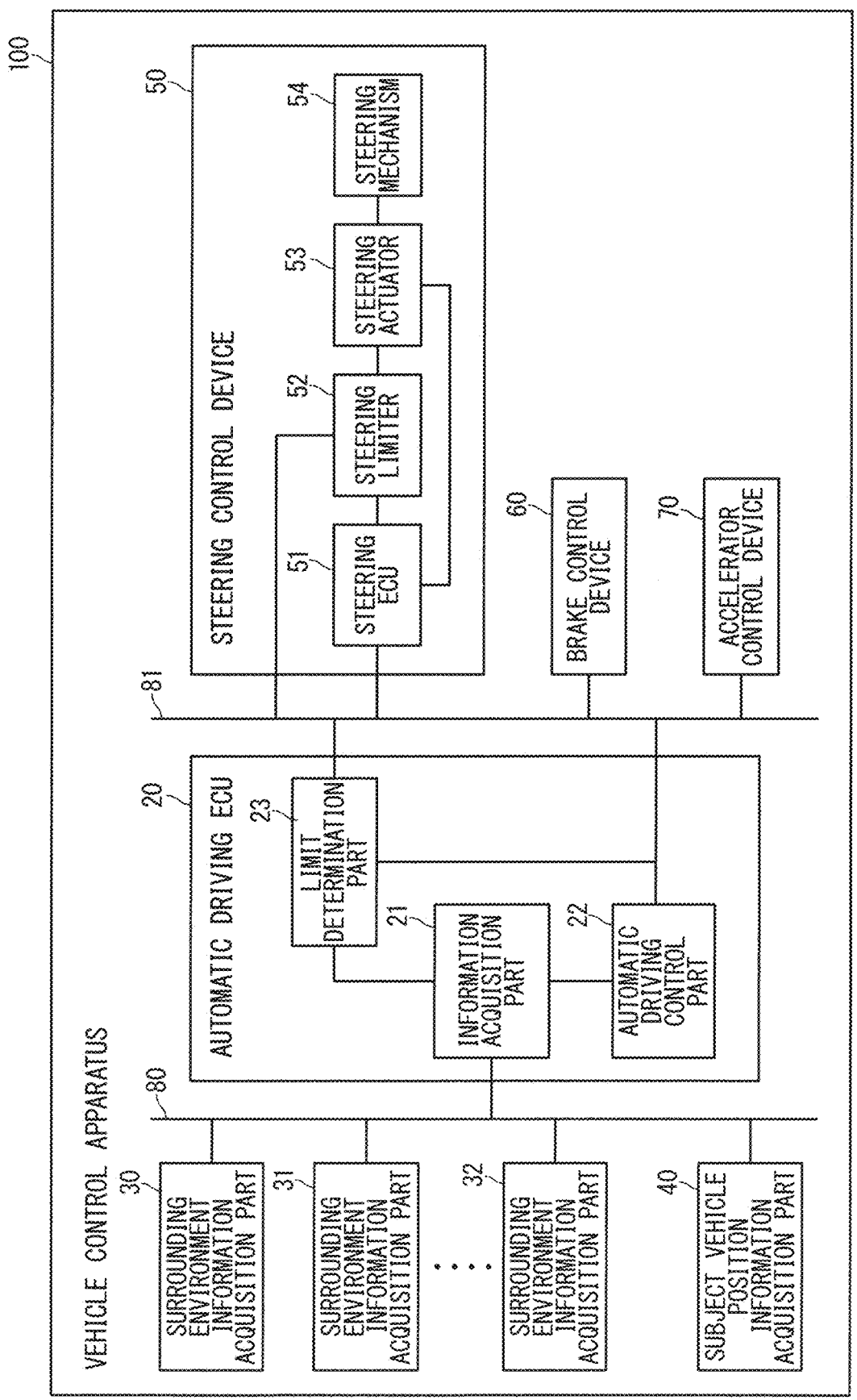
FIG. 1 is a function block diagram illustrating a configuration of a vehicle control apparatus of an embodiment 1 according to the present invention.

FIG. 1 is a function block diagram illustrating a configuration of a vehicle control apparatus 100 of an embodiment 1 according to the present invention. As illustrated in FIG. 1, the vehicle control apparatus 100 includes a plurality of surrounding environment information acquisition parts 30, 31, and 32 mounted on a vehicle and acquiring information of a surrounding environment of the vehicle, an automatic driving ECU 20 (automatic driving control device) controlling an automatic driving based on surrounding environment information and subject vehicle position information being output from a subject vehicle position information acquisition part 40 acquiring the subject vehicle position information, a steering control device 50 controlled by the automatic driving ECU 20, a brake control device 60, and an accelerator control device 70.

The surrounding environment information acquisition parts 30 to 32 and the subject vehicle position information acquisition part 40 are connected to the automatic driving ECU 20 via a network 80, and the steering control device 50, the brake control device 60, and the accelerator control device 70 are connected to the automatic driving ECU 20 via a network 81.

Examples of the surrounding environment information acquisition parts 30 to 32 include various types of sensors such as a camera, a millimeter wave radar, a sonar and a vehicle-to-vehicle and road-to-vehicle communication module, for example. FIG. 1 exemplifies the three surrounding environment information acquisition parts 30 to 32, however, the number of surrounding environment information acquisition parts is not limited thereto. Examples of the subject vehicle position information acquisition part 40 include a receiving device of a global positioning system (GPS) signal and a receiving device of a high accuracy map information having an absolute position accuracy with centimeter precision.

The automatic driving ECU 20 includes an information acquisition part 21, an automatic driving control part 22, and a limit determination part 23. The information acquisition part 21 acquires the surrounding environment information and the subject vehicle position information from the surrounding environment information acquisition parts 30 to 32 and the subject vehicle position information acquisition part 40, respectively, via the network 80, and collects information. The collected information is input to the automatic driving control part 22.

The automatic driving control part 22 determines a travel route along which the subject vehicle intends to travel at a time of executing an automatic driving based on the input information, calculates a target steering angle corresponding to the travel route as an output of the automatic driving ECU 20, and inputs the target steering angle to the steering control device 50. The steering control device 50 calculates a steering control amount (torque amount) for operating a steering actuator 53 based on the input target steering angle. In order to achieve the automatic driving, a target braking amount and a target acceleration amount are also transmitted from the automatic driving ECU 20 to the brake control device 60 and the accelerator control device 70. Each of the brake control device 60 and the accelerator control device 70 performs the actuator control to achieve the automatic driving. The target steering angle, the target braking amount, and the target acceleration amount being output from the automatic driving ECU 20 become a control target value for achieving the automatic driving.

The limit determination part 23 acquires road information and obstacle information around the subject vehicle from the information acquisition part 21, and further acquires information indicating how the subject vehicle is controlled by the automatic driving from the automatic driving control part 22. This information is referred to as the automatic driving control information. The automatic driving control information generated in the automatic driving control part 22 includes state information for determining a control state such as a state of traveling along a straight road, traveling along a curved road, changing lane, turning right and left, and self-parking, for example. The automatic driving control information may include a control target value of the target steering angle, the target braking amount, and the target acceleration amount, for example. The limit determination part 23 determines a future target steering angle of the subject vehicle based on the above control information, and determines a control amount threshold value of regulating an upper limit value and a lower limit value of the steering control amount calculated in the steering control device 50 in accordance with the target steering angle. The limit determination part 23 inputs the determined control amount threshold value to a steering limiter 52 in the steering control device 50. This control amount threshold value is a threshold value for a steering control amount (torque amount) of the steering actuator 53. For example, when a current value of a motor driving an actuator corresponds to steering control amount (torque amount), the control amount threshold value is a threshold value for the current value of the motor.

The steering control device 50 includes a steering ECU 51, the steering limiter 52, the steering actuator 53, and a steering mechanism 54. The steering control device 50 calculates a steering control amount (torque amount) for driving the steering actuator 53 in the steering ECU 51 based on a control target value (target steering angle) being input from the automatic driving ECU 20, and inputs the steering control amount to the steering limiter 52 and the steering actuator 53.

The steering limiter 52 detects whether or not the steering control amount (torque amount) of the input steering actuator 53 exceeds the control amount threshold value being input from the limit determination part 23, and when the steering control amount exceeds the control amount threshold value, the steering limiter 52 changes the steering control amount to fall within a range not exceeding the control amount threshold value. For example, the steering control amount is changed to a value corresponding to the control amount threshold value. Then, the steering actuator 53 is driven with motor current corresponding to the changed steering control amount (torque amount), and functions as a steering torque of the steering mechanism 54 mechanistically connected to the steering actuator 53 to be used for steering control. Accordingly, dangerous control performed by the vehicle can be prevented.

When the steering control amount (torque amount) of the steering actuator 53 does not exceed the control amount threshold value, the steering actuator 53 is driven with the motor current corresponding to the steering control amount (torque amount) being directly input from the steering ECU 51 to the steering actuator 53. When the steering control amount (torque amount) is input from both the steering ECU 51 and the steering limiter 52, the steering actuator 53 selects the steering control amount (torque amount) being input from the steering limiter 52. Herein, the steering control amount is exemplified as the torque amount, however, the steering control amount may be the motor current.

Figure 2:
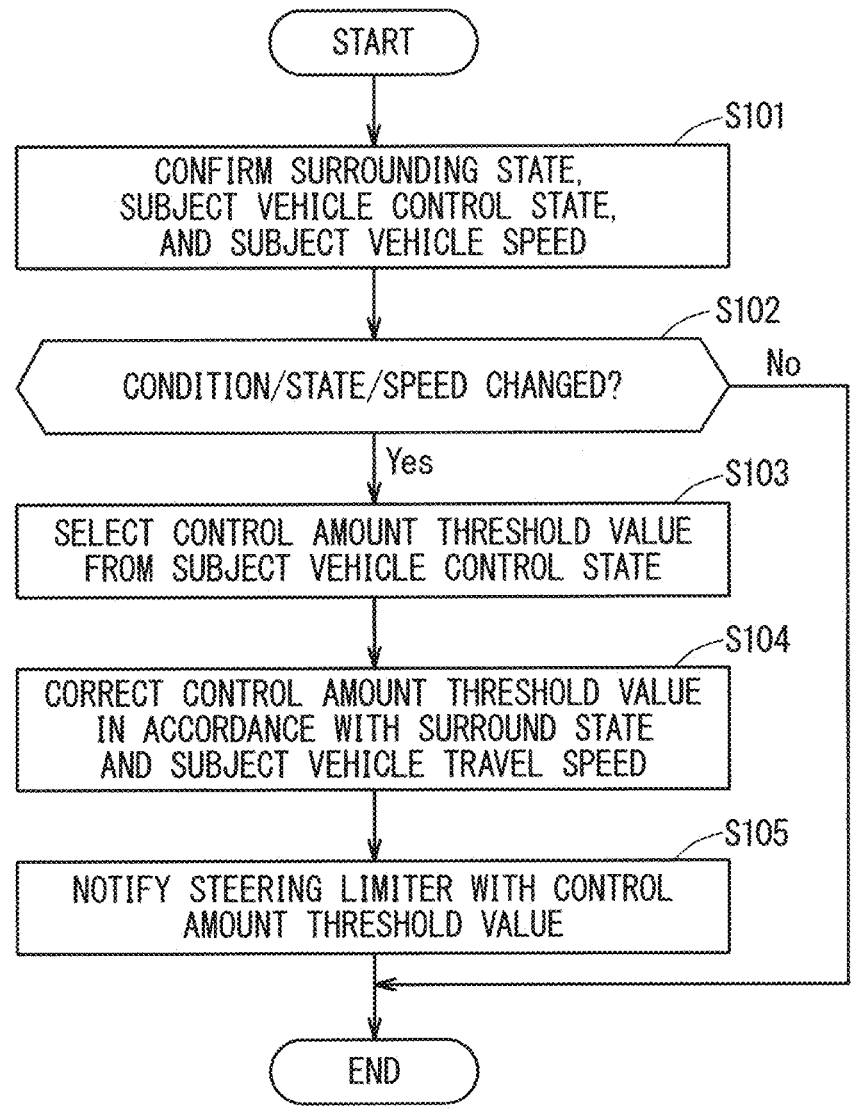
FIG. 2 is a flow chart illustrating a determination operation of a control amount threshold value of the vehicle control apparatus of the embodiment 1 according to the present invention.

FIG. 2 illustrates a flow chart of an operation of the limit determination part 23 determining the control amount threshold value. This flow is executed with a certain period, but may also be executed in conformity to an execution period of the automatic driving control part 22. Herein, the certain period described above indicates a period during which the automatic driving control part 22 transmits the target steering angle, the target braking amount, and a target acceleration amount to the steering control device 50, the brake control device 60, and the accelerator control device 70, and the execution period of the automatic driving control part 22 indicates a period of determining one target steering angle.

As illustrated in FIG. 2, the limit determination part 23 firstly acquires the surrounding environment information, the subject vehicle position information, and the automatic driving control information from the information acquisition part 21 and the automatic driving control part 22 in Step S101 to confirm a surrounding state and current and future subject vehicle control state and subject vehicle speed.

Next, in Step S102, the limit determination part 23 determines whether there is a change in any of the surrounding state and the control state of the subject vehicle and the subject vehicle speed associated with the change in a threshold value described below. When it is determined that there is a change, the limit determination part 23 selects the control amount threshold value (upper limit value and lower limit value) in Step S103, and the process proceeds with Step S104. The selection method is determined by referring to a table described below. In the meanwhile, when it is determined that there is no change, the control amount threshold value is maintained and a series of operations is finished.

In Step S104, the control amount threshold value selected in Step S103 is corrected in accordance with the surrounding state and the travel speed of the subject vehicle. The correction method is described below.

Next, in Step S105, the steering limiter 52 is notified of the corrected control amount threshold value. The correction in Step S104 is not a necessary process, thus when Step S104 is not provided, the steering limiter 52 is notified of the control amount threshold value selected in Step S103.

Figure 3:
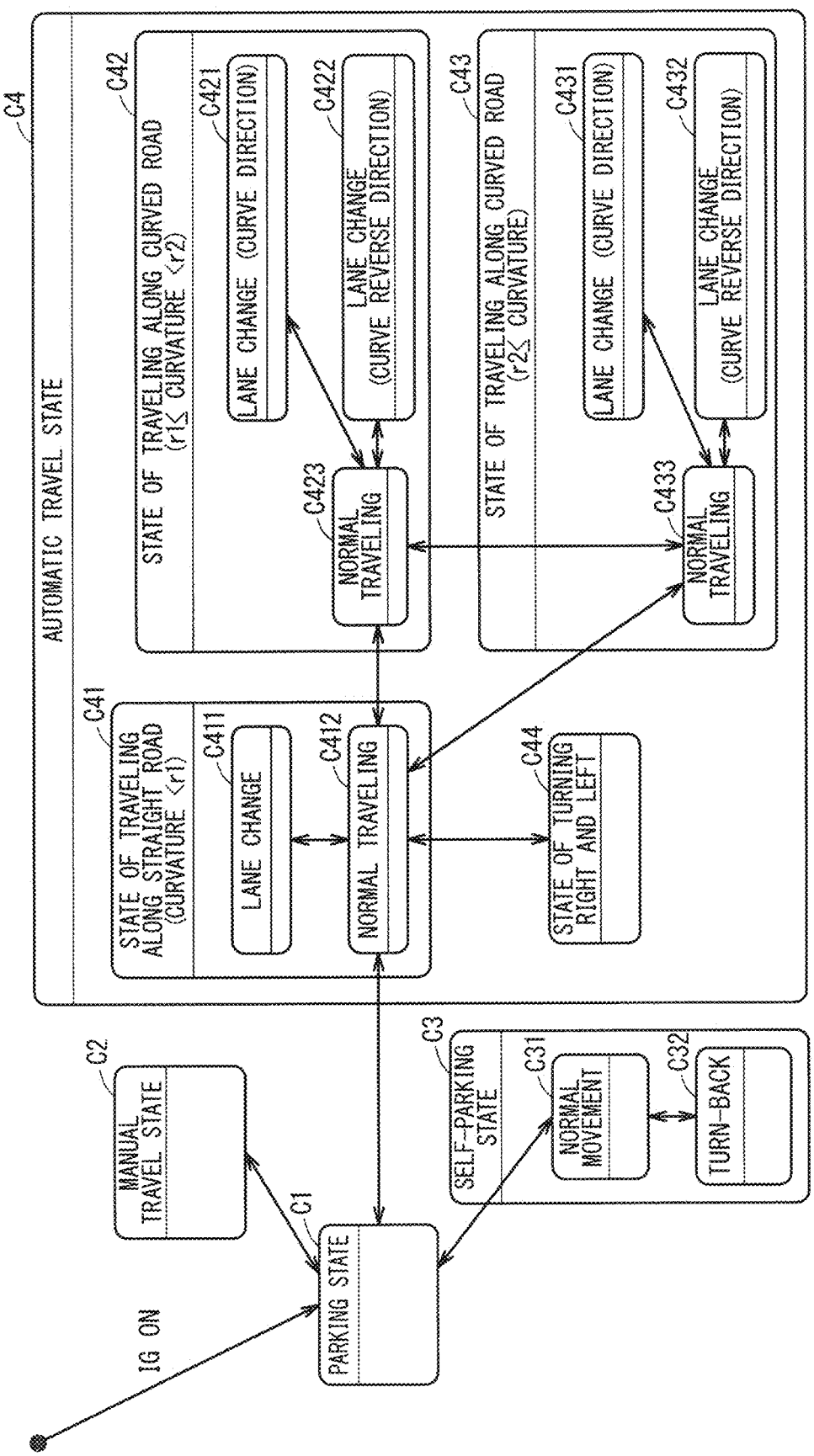
FIG. 3 is a drawing for describing a transition example of a control state in the vehicle control apparatus of the embodiment 1 according to the present invention.

FIG. 3 illustrates a transition example of the control state. As illustrated in FIG. 3, the control state is broadly classified as a parking state C1, a manual travel state C2, a self-parking state C3, and an automatic travel state C4.

At a time when an ignition (IG) is turned on (ON), the vehicle is in the parking state C1. The automatic travel state C4 is classified as a state of traveling along a straight road (curvature<r1) C41 of traveling along a straight road or a road having a small curve curvature (smaller than r1), a state of traveling along a curved road (r1 curvature<r2) C42 of traveling along a gentle curved road, a state of traveling along a curved road (r2≤curvature) C43 of traveling along a sharp curved road, and a state of turning right and left C44 of turning right and left.

Furthermore, the state of traveling along the straight road (curvature<r1) C41 is classified as a lane change C411 and a normal traveling C412. The state of traveling along the curved road (r1≤curvature<r2) C42 is classified as a lane change (curve direction) C421, a lane change (curve reverse direction) C422, and a normal traveling C423. The state of traveling along a curved road (r2≤curvature) C43 is classified as a lane change (curve direction) C431, a lane change (curve reverse direction) C432, and a normal traveling C433.

The control state of the subject vehicle described above is determined in the limit determination part 23 based on the information from the information acquisition part 21 and the automatic driving control part 22. The information from the information acquisition part 21 includes map information around the subject vehicle, information of an obstacle around the subject vehicle, and the subject vehicle position information, and for example, it is acquired from the map information what road the subject vehicle travels along or what road the subject vehicle will travel along in the future, and a type of road such as a straight road or a curved road, a curvature of a curve, and a direction of a curve are determined. The information from the automatic driving control part 22 includes the automatic driving control information for determining the control state such as the automatic travel state or the self-parking state, for example. The control state determined in the limit determination part 23 is a more detailed state of the state information included in the automatic driving control information using the information from the information acquisition part 21.

The surrounding environment information includes preceding vehicle information, and with respect to the lane change, for example, when a speed of a preceding vehicle is slow, and the automatic driving control information from the automatic driving control part 22 includes information of "overtaking" and information that the subject vehicle "turns right" at an intersection a little way ahead, it is determined that the lane is changed to a right lane.

The self-parking state C3 is classified as a normal movement C31 at a normal movement and a turn-back C32 executing turn-back control. The limit determination part 23 determines presence and absence of a state change in Step S102 in FIG. 2 by defining such a state transition. That is to say, the automatic driving control information generated in the automatic driving control part 22 includes information of the above control information, and the limit determination part 23 determines the presence and absence of the state change based in this information. In this manner, the limit determination part 23 determines the control amount threshold value corresponding to the control state after change when the control state changes.

FIG. 4 illustrates an example of a table for determining the control amount threshold value. The limit determination part 23 refers to the table in FIG. 4 when selecting the control amount threshold value based on the automatic driving control information in Step S103 in FIG. 2.

The table illustrated in FIG. 4 shows the control state of the subject vehicle defined in FIG. 3 and an upper limit value and a lower limit value of the control amount threshold value corresponding to the control state as a motor current value corresponding to a torque amount of the steering actuator 53.

For example, when the vehicle travels along a straight road with a curvature smaller than r1, there is no possibility that a large steering is needed, thus a value of $L1_{High}$ is set to the upper limit value as a low threshold value capable of implementing control sufficient for securing stability of the vehicle. There is also a possibility that the steering control is hardly performed, thus a threshold value as the lower limit value is not set.

When a traveling is changed to the curve traveling with a curvature equal to or larger than r1 and smaller than r2, the motor current value corresponding to steering force necessary to travel along the curved road is added to the threshold value, and $L1_{High}+L2_{High}$ is set as the upper limit value, and $L2_{Low}$ is set as the lower limit value to prevent a collision with a wall surface without performing the steering control. The value of $L2_{Low}$ is determined from the steering force needed to maintain the handle in conformity to the curvature of the curve at the time of traveling along the curved road.

Furthermore, in a case of a curve with a large curvature (equal to or larger than r2), $L1_{High}+L3_{High}$ is set as the upper limit value, and $L3_{Low}$ is set as the lower limit value. Herein, a relationship between $L2_{High}$ and $L3_{High}$ is $L2_{High}<L3_{High}$ by reason that the motor current value needed to travel along the curved road increases as the curvature of the curve gets large. $L2_{Low}<L3_{Low}$ applies to the lower limit value. In this manner, the control amount threshold value can be changed in accordance with the curvature of the curve, thus the more appropriate steering control can be achieved.

When the lane is changed during traveling along the straight road, a large steering is performed compared with the case of traveling along the straight road, thus a maximum value $L4_{High}$ of the control amount threshold value which may be generated by the steering for lane change is added to the upper limit value $L1_{High}$ at the time of traveling along the straight road, and $L1_{High}+L4_{High}$ is set as the upper limit value. The steering is returned to the steering of traveling along the straight line at the time of starting and finishing the steering in accordance with the lane change, thus the threshold value is not set for the lower limit value.

When the lane is changed during traveling along the curved road with the curvature equal to or larger than r1 and smaller than r2, the threshold value is set in accordance with a direction of lane change. When the lane is changed in the same direction as the curve, set as the upper limit value is $L1_{High}+L2_{High}+L4_{High}$ obtained by adding a maximum value $L4_{High}$ of the control amount threshold value which may be generated by the steering for lane change to the upper limit value at the time of traveling along the curved road, and the lower limit value $L2_{Low}$ at the time of traveling the curved road is set as the lower limit value.

When the lane is changed in a direction opposite to the curve, the control amount threshold value is not larger than the control amount threshold value in the case of traveling along the curved road, thus the upper limit value $L1_{High}+L2_{High}$ which is the same as the case of traveling along the curved road is set. With regard to the lower limit value, the lower limit value which is the same as the case of traveling along the curved road is set in FIG. 4, however, a value smaller than $L2_{Low}$ may be or may not be set.

In the case where the lane is changed during traveling along the curved road with the curvature larger than r2, when the lane is changed in the same direction as the curve, set as the control amount threshold value is $L1_{High}+L3_{High}+L4_{High}$ as the upper limit value, and $L3_{Low}$ as the lower limit value. When the lane is changed in a direction opposite to the curve, the upper limit value $L1_{High}+L3_{High}$ which is the same as the case of traveling along the curved road is set as the upper limit value, and $L3_{Low}$ is set as the lower limit value.

$L5_{High}$ is set as the upper limit value in turning right and left, and the lower limit value is not set. In a parking state, at the time of normal movement and turn-back, different control amount threshold values such as $L6_{High}$ and $L7_{High}$ are set as the upper limit values, and the lower limit value is not set. This is because in case of the parking state, the steering amount is significantly different at the time of the turn-back of the vehicle and the normal movement, thus, the different control amount threshold value are applied in accordance with the state. FIG. 4 illustrates one example of the setting of the control amount threshold value, and a control amount threshold value other than this may be set in accordance with a state of the vehicle.

In this manner, the table for selecting the control amount threshold value is used, thus the control amount threshold value can be set easily.

Described next using FIG. 5 to FIG. 8 is a condition where the limit determination part 23 performs correction of the control amount threshold value during traveling along the straight road. This correction can be determined in consideration of a time (FTTI: fault tolerant time interval) from an occurrence of assumed abnormality to an occurrence of a hazardous event on the vehicle and a road surface state obtained as a result of a safely analysis.

Figure 5:
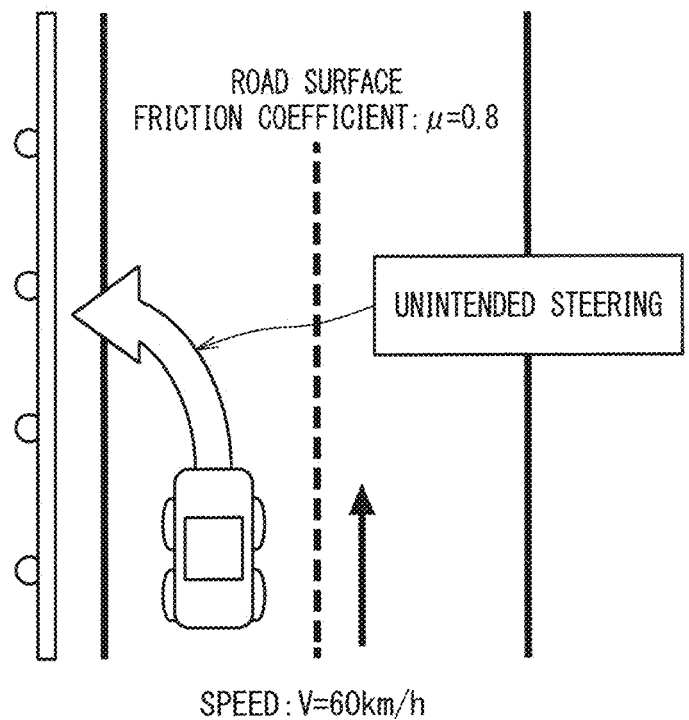
FIG. 5 is a drawing for describing a condition of correcting the control amount threshold value in the vehicle control apparatus of the embodiment 1 according to the present invention.

The FTTI changes depending on the surrounding state of the vehicle. For example, when it is assumed that data of the target steering angle provided by the automatic driving ECU 20 changes in the steering ECU 51 and a steering state enters a state where a route rapidly changes during traveling along the straight road, the FTTI changes depending on a collision distance to an obstacle, for example, a guard rail. FIG. 5 illustrates a state where there is not enough space for a width from a lane to a guard rail GR, that is to say, a berm width, and a vehicle travels along a road assumed to have a dry road surface with a road surface friction coefficient μ=0.8 at a speed V=60 km/h. In this state, there is a high possibility that the vehicle collides with the guard rail GR even with a slight movement in a lateral direction due to an unintended steering, thus $L1_{High}$ of the upper limit value of the control amount threshold value selected in Step S103 is not corrected.

Figure 6:
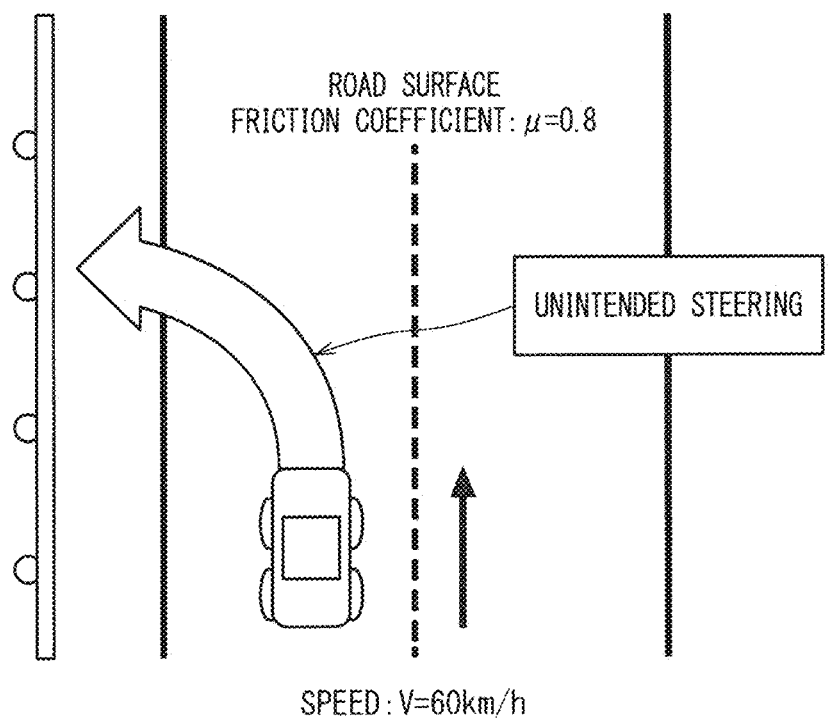
FIG. 6 is a drawing for describing a condition of correcting the control amount threshold value in the vehicle control apparatus of the embodiment 1 according to the present invention.

In the meanwhile, in a case where there is enough space for the berm width as illustrated in FIG. 6, even when the vehicle travels at the same speed V=60 km/h, there is enough time until the collision with the guard rail GR due to the unintended steering, thus a correction of increasing the control amount threshold value (upper limit value) may also be performed. As described above, a possibility that a small change in the lateral direction leads to danger is considered to be increased as the FTTI gets shorter, thus the limit determination part 23 reduces or does not change the control amount threshold value.

A road surface state estimated as a surrounding state can also be used as a condition of the limit determination part 23 correcting the control amount threshold value. FIG. 7 illustrates a state where a vehicle travels along a road assumed to have a wet road surface with a road surface friction coefficient μ=0.5 at a speed V=60 km/h. As illustrated in FIG. 7, when the vehicle travels along a road having a road surface with a low road surface friction coefficient μ (low μ route), there is a possibility that the vehicle slips even with a small steering torque due to an unintended steering, and collides with the guard rail GR. Accordingly, when the state of the road surface can be estimated as the surrounding state, in a case where the vehicle travels along the low μ route, the limit determination part 23 performs the correction to set the control amount threshold value (upper limit value) to low.

Information of rainfall and snowfall is acquired based on a video of an in-vehicle camera as a method of estimating the road surface state, for example, and a rough friction coefficient can be estimated. It can also be estimated whether or not the road surface is frozen in consideration of a temperature and humidity. A friction coefficient of a snowfall road surface is 0.5 to 0.2, and a friction coefficient of a frozen road surface is 0.2 to 0.1.

A speed of the subject vehicle (vehicle speed) can also be used as a condition of the limit determination part 23 correcting the control amount threshold value. FIG. 8 illustrates a state where a vehicle travels along a road with a road surface friction coefficient μ=0.8 at a high speed V=100 km/h. When the vehicle travels at the high speed 100 km/h as illustrated in FIG. 8, a large movement in the lateral direction is caused even by a small steering torque due to an unintended steering, thus the correction is performed to set the control amount threshold value (upper limit value) to small. In contrast, when the vehicle travels at a low speed, the correction may be performed to set the control amount threshold value (upper limit value) to large. In FIG. 5 to FIG. 8, the correction method is described based on the time until the collision with the guard rail, however, when a pedestrian is detected on a berm from the surrounding environment information, the correction may be performed based on a possibility of collision with the pedestrian. When the berm width is included in the map information, a value thereof may be used, and when the berm width is not included in the map information, a value can also be calculated from a position of the subject vehicle, a lateral width of the subject vehicle, and a road surface width of the map information.

Figure 9:
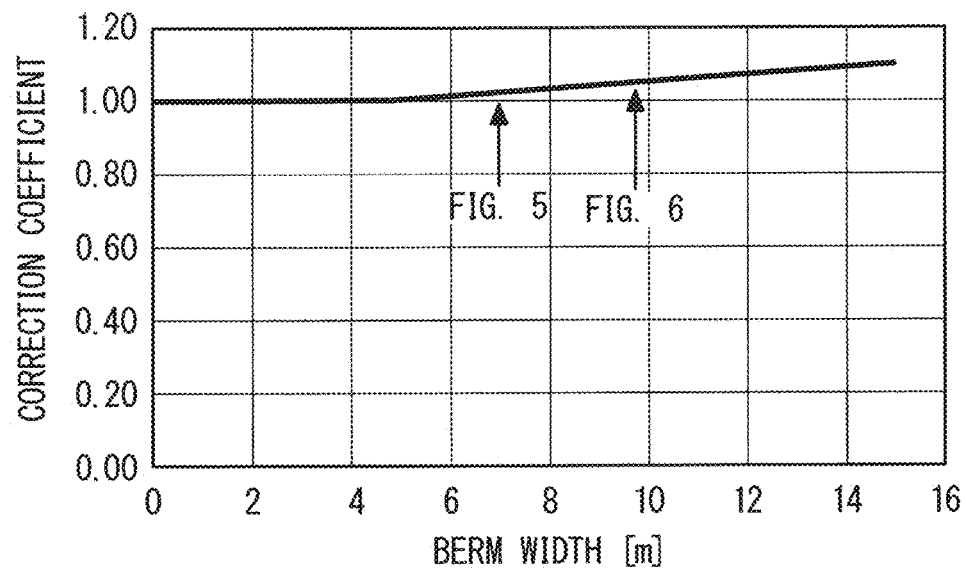
FIG. 9 is a drawing illustrating a relationship between a berm width and a correction coefficient.
Figure 10:
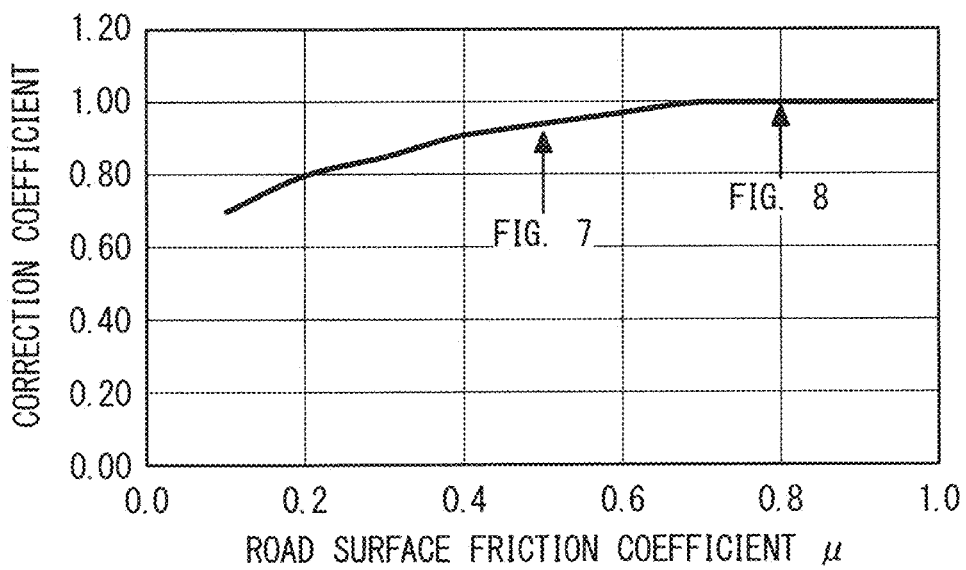
FIG. 10 is a drawing illustrating a relationship between a road surface friction coefficient and a correction coefficient.
Figure 11:
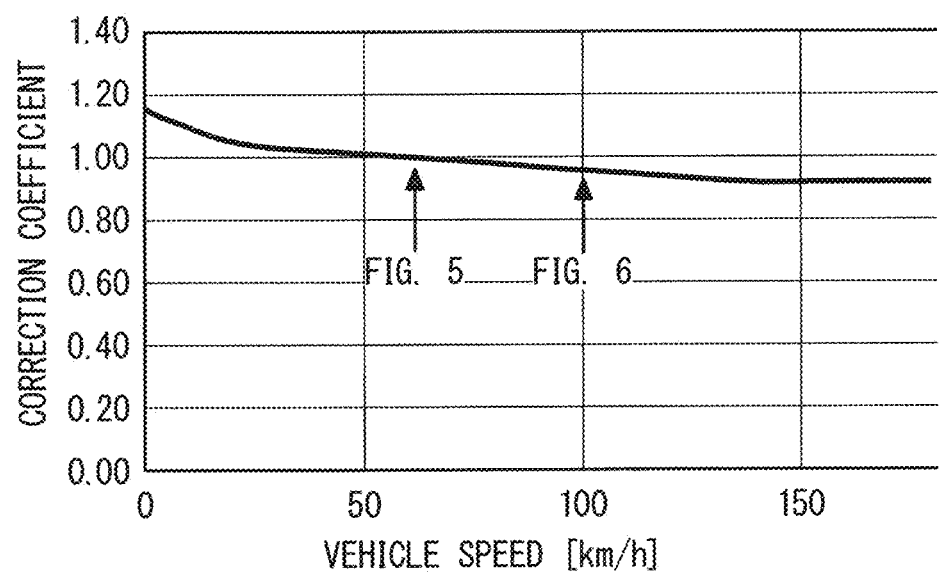
FIG. 11 is a drawing illustrating a relationship between a vehicle speed and a correction coefficient.

Next, a relationship between the correction coefficient and the berm width, the road surface friction coefficient, and the vehicle speed in the state where the control amount threshold value is corrected described using FIG. 5 to FIG. 8 is described using FIG. 9 to FIG. 11.

FIG. 9 is a drawing illustrating a relationship between the berm width and the correction coefficient, a lateral axis indicating the berm width [m] and a vertical axis indicating the correction coefficient. The case where there is not enough space for the berm width and the case where there is enough space for the berm width described using FIG. 5 and FIG. 6 are indicated by arrows as FIG. 5 and FIG. 6, respectively.

As illustrated in FIG. 9, the correction coefficient is increased as the berm width, that is to say, the distance from the vehicle to the obstacle gets large, thus the control amount threshold value is increased.

FIG. 10 is a drawing graphically illustrating a relationship between the road surface friction coefficient and the correction coefficient, a lateral axis indicating the road surface friction coefficient and a vertical axis indicating the correction coefficient. The cases where the road surface friction coefficient described using FIG. 7 and FIG. 8 is small and large are indicated by arrows as FIG. 7 and FIG. 8, respectively.

As illustrated in FIG. 10, the correction coefficient is reduced as the road surface friction coefficient gets small, and thereby the control amount threshold value gets small.

FIG. 11 is a drawing illustrating a relationship between the vehicle speed and the correction coefficient, a lateral axis indicating the vehicle speed [km/h] and a vertical axis indicating the correction coefficient. The cases where the vehicle speed described using FIG. 5 and FIG. 8 is 60 km/h and 100 km/h are indicated by arrows as FIG. 5 and FIG. 8, respectively.

As illustrated in FIG. 11, the correction coefficient is reduced as the vehicle speed gets large, and thereby the control amount threshold value gets small.

Each of the graphs illustrated in FIGS. 9 to 11 shows one example, and a form (characteristics) of the graph is not limited thereto. It is also considered that the control amount threshold value is calculated in consideration of characteristics of the vehicle, force applied to the vehicle, a movement amount of the vehicle in the lateral direction, and a time until an automatic drive system or a driver copes with a situation, for example, and a proportional relationship, quadratic curve, an upwardly convexed form, and a downwardly convexed form, for example, are applied.

The limit determination part 23 multiplies the correction coefficient described above to the control amount threshold value in Step S104 illustrated in FIG. 2, thereby correcting the control amount threshold value.

As described above, the control amount threshold value of the steering control device 50 is appropriately set in accordance with the surrounding state and the control state of the subject vehicle, thus both an expansion of functionality and safety in the automatic driving can be achieved.

Figure 12:
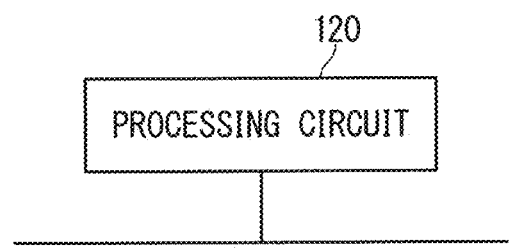
FIG. 12 is a block diagram illustrating a hardware configuration of an automatic driving ECU of the vehicle control apparatus of the embodiment 1 according to the present invention.

Each configuration of the automatic driving ECU 20 described above can be configured using a computer, and is achieved by the computer executing a program. That is to say, the information acquisition part 21, the automatic driving control part 22, and the limit determination part 23 in the automatic driving ECU 20 illustrated in FIG. 1 are achieved by a processing circuit 120 illustrated in FIG. 12, for example. A processor such as a central processing unit (CPU) and a digital signal processor (DSP) is applied to the processing circuit 120, and a program stored in a storage device is executed to achieve a function of each configuration.

Dedicated hardware may be applied to the processing circuit 120. When the processing circuit 120 is the dedicated hardware, a single circuit, a combined circuit, a programmed processor, a parallel-programmed processor, an application specific integrated circuit (ASIC), a field programmable gate array (FPGA), and a circuit combining them, for example, falls under the processing circuit 120.

Figure 13:
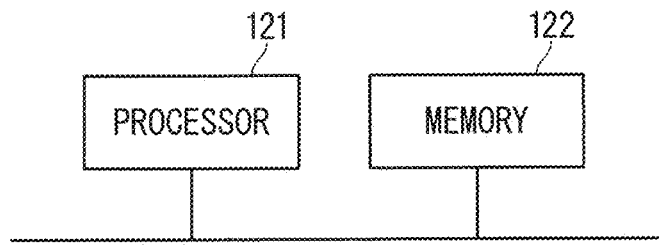
FIG. 13 is a block diagram illustrating a hardware configuration of the automatic driving ECU of the vehicle control apparatus of the embodiment 1 according to the present invention.

FIG. 13 illustrates a hardware configuration in a case where each configuration (the information acquisition part 21, the automatic driving control part 22, and the limit determination part 23) of the automatic driving ECU 20 illustrated in FIG. 1 is configured using the processor. In this case, a function of each configuration of the automatic driving ECU 20 is achieved by a combination of software (software, firmware, or a combination of software and firmware), for example. The software, for example, is described as a program and is stored in a memory 122. The processor 121 functioning as the processing circuit 120 reads out and executes the program stored in the memory 122 (the storage device), thereby achieving the function of each unit.

Embodiment 2

Figure 14:
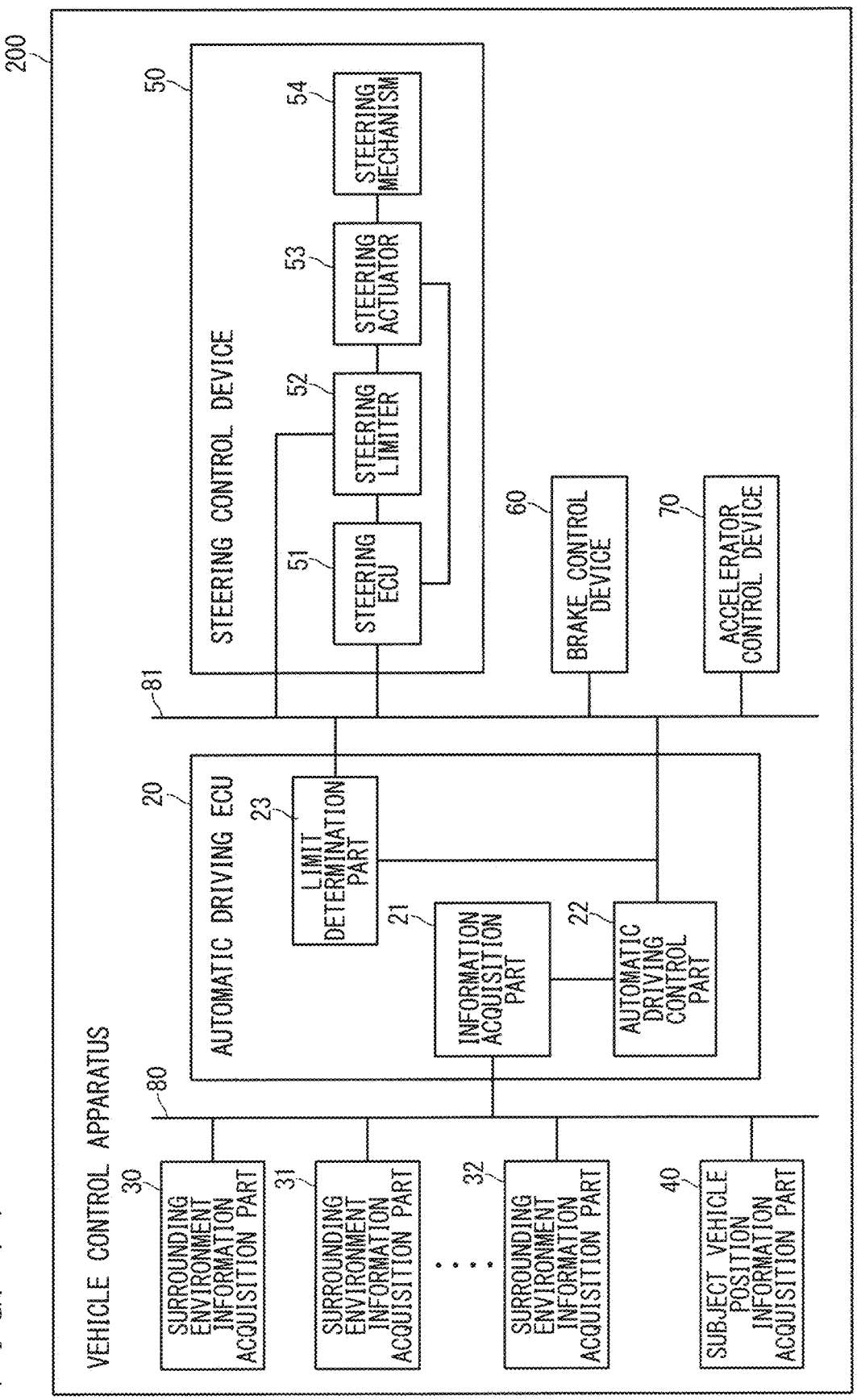
FIG. 14 is a function block diagram illustrating a configuration of a vehicle control apparatus of an embodiment 2 according to the present invention.

FIG. 14 is a function block diagram illustrating a configuration of a vehicle control apparatus 200 of an embodiment 2 according to the present invention. The vehicle control apparatus 200 illustrated in FIG. 14 and the vehicle control device 100 illustrated in FIG. 1 are different from each other in that information is input from only the automatic driving control part 22 to the limit determination part 23 in the automatic driving ECU 20. That is to say, in the vehicle control apparatus 200 of the embodiment 2, the determination of the control amount threshold value performed by the limit determination part 23 is determined by a control target value being output by the automatic driving control part 22 as the automatic driving control information.

Figure 15:
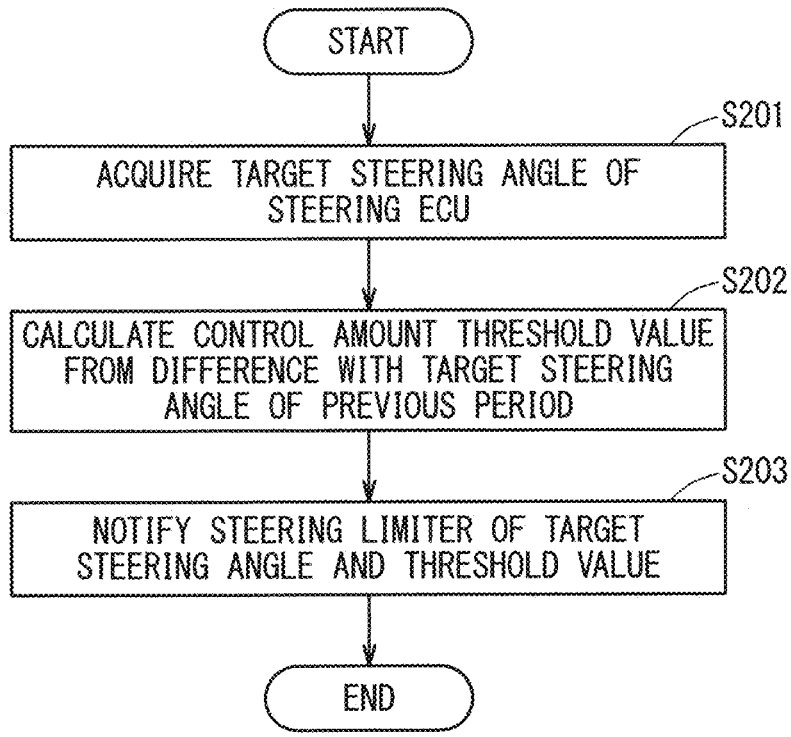
FIG. 15 is a flow chart illustrating a determination operation of a control amount threshold value of the vehicle control apparatus of the embodiment 2 according to the present invention.

FIG. 15 illustrates a flow chart of an operation of the limit determination part 23 determining the control amount threshold value. This flow is executed with a certain period, but may also be executed in conformity to an execution period of the automatic driving control part 22.

As illustrated in FIG. 15, firstly in Step S201, the limit determination part 23 acquires the target steering angle (the control target value) calculated by the automatic driving control part 22 and being input to the steering control device 50 as the automatic driving control information.

The limit determination part 23 have the target steering angle (the control target value) of a previous period in advance, and calculates a difference value with the target steering angle of the previous period in Step S202, thereby being able to determine the steering control amount (the torque amount) of the steering actuator 53 which needs to be generated in accordance with the difference value. For example, a value which is ten percent larger than the determined steering control amount is calculated as the upper limit value of the control amount threshold value, and a value which is ten percent smaller than that is calculated as the lower limit value of the control amount threshold value. The ratio described above is one example, thus the ratio for determining the value is not limited thereto.

Next, the steering limiter 52 is notified of the control amount threshold value in Step S203.

As described above, in the vehicle control apparatus 200 of the embodiment 2 according to the present invention, the control amount threshold value of the steering control device 50 is dynamically determined based on the target steering angle being input to the steering control device 50, thus the automatic driving corresponding to various situations can be achieved compared with a case where the control amount threshold value is fixed. The control amount threshold value is set, thus safety in a failure of the steering ECU 51 can also be secured.

Modification Example

In the embodiment 1 and the embodiment 2 described above, the limit determination part 23 transmits the dynamically generated control amount threshold value to the steering limiter 52, thus the steering limiter 52 detects whether or not the steering control amount (torque amount) of the steering actuator 53 exceeds the control amount threshold value, and changes the steering control amount to fall within the range not exceeding the control amount threshold value when the steering control amount exceeds the control amount threshold value. In addition, included in the present modification example is a function that, even in the case where the steering control amount is changed to fall within the range not exceeding the control amount threshold value, when the steering limiter 52 detects the motor current value exceeding the range of the control amount threshold value, the automatic driving control part 22 is notified that the steering limiter 52 detects the abnormality.

Figure 16:
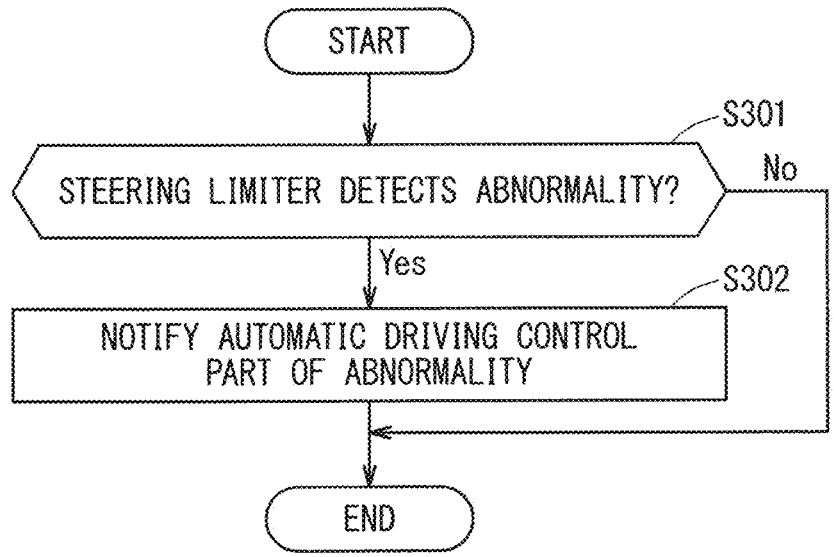
FIG. 16 is a flow chart illustrating an operation at a time of detecting an abnormality in a limit determination part in a vehicle control apparatus of a modification example according to the present invention.

FIG. 16 illustrates a flow chart of an abnormality detection performed by the steering limiter 52. As illustrated in FIG. 16, when the steering limiter 52 detects in Step S301 that the motor current value of the steering actuator 53 exceeds the control amount threshold value, the steering limiter 52 determines that the abnormality is detected, and the process proceeds with Step S302. In the meanwhile, when the steering control amount (torque amount) of the steering actuator 53 is smaller than the control amount threshold value, the series of processing is finished.

In Step S302, the automatic driving control part 22 is notified that the abnormality is detected, and the series of processing is finished.

Considered as the case where the motor current value exceeding the range of the control amount threshold value is detected is a case where data of a control target value provided by the automatic driving ECU 20 is lost or changed due to an electrical noise, for example, or a case where the steering ECU 51 breaks down such as a case where a memory in the steering ECU 51 is broken, for example.

Figure 17:
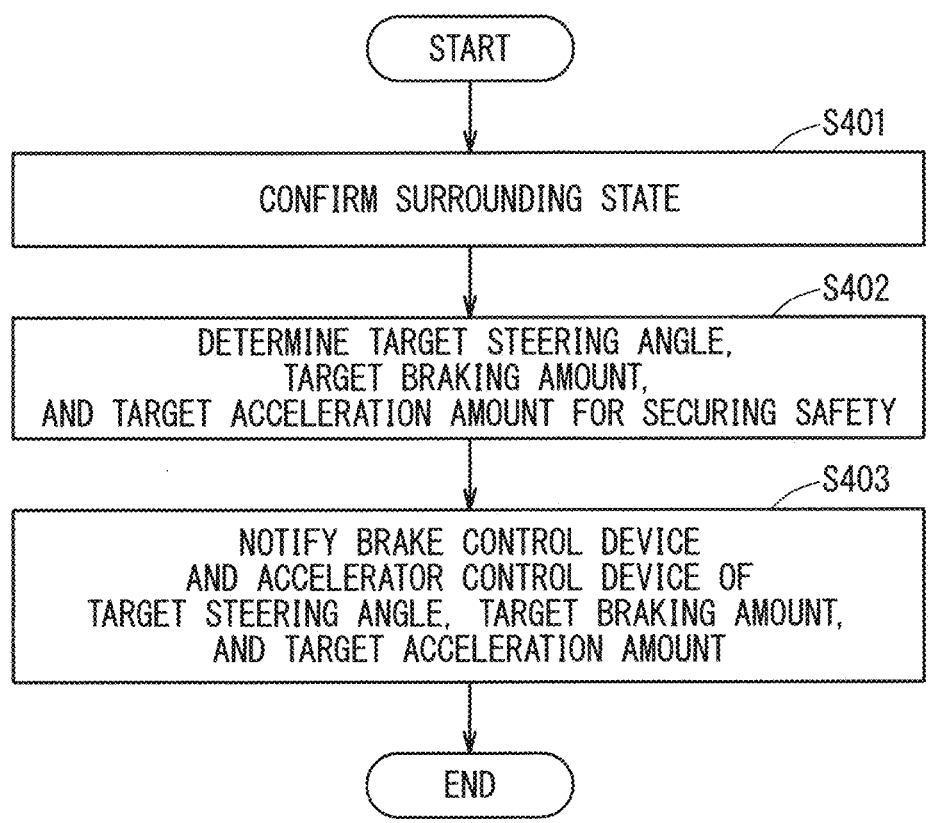
FIG. 17 is a flow chart illustrating an operation of an automatic driving control part after receiving a notification of detecting the abnormality in the vehicle control apparatus of the modification example according to the present invention.

FIG. 17 is a flow chart illustrating an operation of the automatic driving control part 22 after receiving the notification of the abnormality detection from the steering limiter 52. As illustrated in FIG. 17, the automatic driving control part 22 receiving the notification of the abnormality detection confirms the surrounding state based on the surrounding environment information being input from the information acquisition part 21 in Step S401, and determines the target steering angle, the target braking amount, and the target acceleration amount for securing the safety of the subject vehicle in Step S402.

The target steering angle, the target braking amount, and the target acceleration amount serve as the control target value for achieving an operation of stopping by applying a brake and an operation of stopping control of the accelerator when there is no obstacle around the subject vehicle, for example. When there is the obstacle around the subject vehicle, the target steering angle, the target braking amount, and the target acceleration amount serve as the control target value within a range capable of avoid the obstacle, for example, the control target value for achieving an operation of stopping by a slow brake while maintaining a distance from the subject vehicle to a preceding vehicle or a following vehicle, for example.

The control target value determined in Step S402 is transmitted to the brake control device 60 and the accelerator control device 70 in Step S403 to achieve the vehicle control.

As described above, the control described in the present modification example is performed, thus even if abnormality occurs in the steering ECU 51, the vehicle can be stopped while maintaining the safety.

The present invention has been shown and described in detail, the foregoing description is in all aspects illustrative and not restrictive. It is therefore understood that numerous modifications and variations can be devised without departing from the scope of the invention.

According to the present invention, the above embodiments can be arbitrarily combined, or each embodiment can be appropriately varied or omitted within the scope of the invention.

The invention claimed is:

1. A vehicle control apparatus to control a vehicle, comprising:
    automatic driving control circuitry to determine a travel route at a time of executing an automatic driving based on surrounding environment information and position information of the vehicle, and to output a control target value corresponding to the travel route; and
    steering control circuitry to calculate a steering control amount based on the control target value, and to perform steering control of the vehicle based on the steering control amount, wherein
    the automatic driving control circuitry generates automatic driving control information indicating a control state in an automatic driving of the vehicle and including the control target value, dynamically determines a control amount threshold value for regulating a limit of the steering control amount based on the automatic driving control information which has been generated, and provides the steering control circuitry with the control amount threshold value, and
    the steering control circuitry changes the steering control amount to fall to the limit of the steering control amount, which is within a range not exceeding the control amount threshold value, when the steering control amount exceeds the control amount threshold value.

2. The vehicle control apparatus according to claim 1, wherein
    the automatic driving control information includes state information of at least an automatic travel state and a self-parking state as the control state,
    the state information of the automatic travel state includes first state information including a state of traveling along a straight road and a state of traveling along a curved road,
    the state information of the state traveling along the straight road and the state of traveling along the curved road includes state information indicating whether or not a lane is changed,
    the state information of the self-parking, state includes second state information including a normal movement state and a turn-back state, and
    the automatic driving control circuitry determines the control amount threshold value based on a table of the control amount threshold value being set for each combination of the state information of the automatic travel state and the state information of the self-parking state.

3. The vehicle control apparatus according to claim 1, wherein
    the automatic driving control circuitry corrects the control amount threshold value based on the surrounding environment information or a travel speed of the vehicle.

4. The vehicle control apparatus according to claim 3, wherein
    the control amount threshold value is corrected by multiplying a correction coefficient being set in accordance with a distance to an obstacle, with which the vehicle is assumed to collide, obtained from the surrounding environment information to the control amount threshold value.

5. The vehicle control apparatus according to claim 4, wherein
    the correction coefficient is set to increase the control amount threshold value when the distance to the obstacle is large and reduce the control amount threshold value when the distance to the obstacle is small.

6. The vehicle control apparatus according to claim 3, wherein
    the control amount threshold value is corrected by multiplying a correction coefficient being set in accordance with a road surface friction coefficient obtained from the surrounding environment information to the control amount threshold value.

7. The vehicle control apparatus according to claim 6, wherein
    the correction coefficient is set to increase the control amount threshold value when the road surface friction coefficient is relatively large and reduce the control amount threshold value when the road surface friction coefficient is relatively small.

8. The vehicle control apparatus according to claim 3, wherein
    the control amount threshold value is corrected by multiplying a correction coefficient being set in accordance with the travel speed to the control amount threshold value.

9. The vehicle control apparatus according to claim 7, wherein
    the correction coefficient is set to increase the control amount threshold value when the travel speed is relatively high and reduce the control amount threshold value when the travel speed is relatively low.

10. The vehicle control apparatus according to claim 1, wherein
    the steering control circuitry notifies the automatic driving control circuitry that an abnormality is detected when the steering control amount exceeds the control amount threshold value, and
    the automatic driving control circuitry controls a brake and an accelerator so that the vehicle is stopped when the abnormality is detected by the steering control circuitry.

* * * * *